(12) United States Patent
Beckmann

(10) Patent No.: US 10,988,016 B2
(45) Date of Patent: Apr. 27, 2021

(54) HYDRAULIC BEARING

(71) Applicant: VIBRACOUSTIC GMBH, Darmstadt (DE)

(72) Inventor: Wolfgang Beckmann, Darmstadt (DE)

(73) Assignee: VIBRACOUSTIC GMBH, Darmstadt (DE)

(*) Notice: Subject to any disclaimer, the term of this patent is extended or adjusted under 35 U.S.C. 154(b) by 5 days.

(21) Appl. No.: 16/327,499

(22) PCT Filed: Aug. 24, 2017

(86) PCT No.: PCT/EP2017/071354
§ 371 (c)(1),
(2) Date: Feb. 22, 2019

(87) PCT Pub. No.: WO2018/041719
PCT Pub. Date: Mar. 8, 2018

(65) Prior Publication Data
US 2019/0176606 A1    Jun. 13, 2019

(30) Foreign Application Priority Data
Aug. 29, 2016 (DE) .................... 10 2016 116 079.2

(51) Int. Cl.
*B60K 5/12* (2006.01)
*F16F 13/10* (2006.01)

(52) U.S. Cl.
CPC ............ *B60K 5/1208* (2013.01); *F16F 13/10* (2013.01); *F16F 13/108* (2013.01);
(Continued)

(58) Field of Classification Search
CPC .......... F16F 13/10; F16F 13/08; F16F 13/107; F16F 13/007; F16F 13/106; F16F 13/105;
(Continued)

(56) References Cited

U.S. PATENT DOCUMENTS 4,613,117 A    9/1986  Andra
4,921,049 A *  5/1990  Kaiser ................ F16F 13/08
                                         267/140.13
(Continued)

FOREIGN PATENT DOCUMENTS

CN    1236074 A    11/1999
CN    1510326 A     7/2004
(Continued)

OTHER PUBLICATIONS

International Search Report PCT/EP2017/071354, filed Nov. 7, 2017.
(Continued)

*Primary Examiner* — Bradley T King
*Assistant Examiner* — Mahbubur Rashid
(74) *Attorney, Agent, or Firm* — Fishman Stewart PLLC

(57) ABSTRACT

A hydraulic mount, in particular for mounting a motor vehicle engine, includes a mount core, a supporting spring comprising an elastomer material, a working chamber delimited by the supporting spring, and a compensation chamber separated from the working chamber by an intermediate plate. The working chamber and the compensation chamber may be filled with hydraulic fluid and connected to each other by a flow transfer duct. The mount core may have a first mount core part and a second mount core part operationally connected to each other by an elastomer body for high-frequency vibration decoupling. The elastomer body has a first elastomer body portion configured to absorb at least a static mount load acting on the mount core, and a second elastomer body portion configured to absorb at least a transverse force acting on the mount core.

10 Claims, 1 Drawing Sheet

(52) U.S. Cl.
CPC . *F16F 2224/025* (2013.01); *F16F 2224/0208* (2013.01); *F16F 2226/042* (2013.01)

(58) Field of Classification Search
CPC ........ F16F 13/16; F16F 13/108; F16F 13/085; F16F 13/1463; F16F 13/102; F16F 15/04; F16F 2224/025; F16F 13/1427; F16F 13/24; F16F 2228/066; F16F 7/087; F16F 9/04; F16F 9/0418
See application file for complete search history.

(56) References Cited

U.S. PATENT DOCUMENTS

| | | | | |
|---|---|---|---|---|
| 5,102,105 A * | 4/1992 | Hamaekers | ............ | F16F 13/18 180/902 |
| 5,104,100 A * | 4/1992 | Simuttis | ............... | F16F 13/106 267/140.13 |
| 5,340,094 A | 8/1994 | Schyboll et al. | | |
| 5,462,261 A * | 10/1995 | Eckel | .................... | F16F 13/262 267/140.13 |
| 5,620,168 A * | 4/1997 | Ohtake | ................... | F16F 13/26 267/140.13 |
| 5,707,047 A * | 1/1998 | Meyering | ............. | F16F 13/106 267/140.13 |
| 5,772,189 A * | 6/1998 | Satori | ..................... | F16F 13/10 267/140.13 |
| 6,244,578 B1 * | 6/2001 | Schwerdt | ................ | F16F 13/26 267/140.13 |
| 6,341,766 B1 * | 1/2002 | Stiller | .................... | F16F 13/18 267/140.13 |
| 6,371,462 B2 * | 4/2002 | Gennesseaux | ........ | F16F 13/108 267/122 |
| 6,422,545 B1 * | 7/2002 | Baudendistel | ........ | F16F 13/268 267/140.13 |
| 6,655,667 B1 * | 12/2003 | Hamaekers | ........... | F16F 13/105 267/140.13 |
| 6,793,206 B2 * | 9/2004 | Reh | ....................... | F16F 13/106 267/140.13 |
| 7,007,934 B2 * | 3/2006 | Goto | ..................... | F16F 13/108 267/140.13 |
| 7,117,969 B2 * | 10/2006 | Miyamoto | ........... | B60K 5/1208 180/291 |
| 7,341,244 B1 * | 3/2008 | Adams | ..................... | F16F 1/54 267/140.13 |
| 7,419,144 B2 * | 9/2008 | Hasegawa | ............. | F16F 13/106 267/140.13 |
| 9,212,721 B2 | 12/2015 | Eckel et al. | | |
| 2001/0004141 A1 * | 6/2001 | Shimoda | ............... | F16F 13/105 267/140.13 |
| 2002/0000688 A1 * | 1/2002 | Simuttis | .................. | F16F 13/18 267/140.13 |
| 2002/0043748 A1 * | 4/2002 | Meyer | .................... | F16F 13/106 267/140.11 |
| 2002/0158389 A1 * | 10/2002 | Yoshida | .................. | F16F 13/16 267/140.11 |
| 2003/0001322 A1 | 1/2003 | Goto et al. | | |
| 2003/0038414 A1 * | 2/2003 | Pizanti | .................. | F16F 13/103 267/140.13 |
| 2003/0141640 A1 | 7/2003 | Kato | | |
| 2004/0212133 A1 * | 10/2004 | Thomazeau | .......... | F16F 13/106 267/140.13 |
| 2006/0043658 A1 * | 3/2006 | Tanaka | .................... | F16F 13/10 267/140.13 |
| 2006/0097436 A1 * | 5/2006 | Yamamoto | ............ | F16F 13/101 267/140.12 |
| 2006/0163784 A1 * | 7/2006 | Yamamoto | .............. | F16F 13/10 267/140.13 |
| 2008/0169592 A1 * | 7/2008 | Adams | .................... | F16F 3/093 267/140.13 |
| 2008/0246199 A1 * | 10/2008 | Siemer | .................... | F16F 13/10 267/140.5 |
| 2009/0026671 A1 * | 1/2009 | Kojima | ............... | F16F 13/1463 267/121 |
| 2011/0042870 A1 * | 2/2011 | Kojima | .................... | F16F 13/10 267/140.11 |
| 2011/0210488 A1 * | 9/2011 | Yamamoto | ............ | F16F 13/106 267/140.13 |
| 2011/0291335 A1 * | 12/2011 | Rooke | ..................... | F16F 13/18 267/140.13 |
| 2012/0091640 A1 * | 4/2012 | Ogawa | .................. | F16F 13/106 267/140.13 |
| 2012/0126090 A1 * | 5/2012 | Kojima | ................. | B60K 5/1208 |
| 2012/0200021 A1 * | 8/2012 | Kan Aya | ................ | F16F 13/10 267/140.13 |
| 2012/0248669 A1 * | 10/2012 | Masuda | .................. | F16F 13/18 267/140.13 |
| 2012/0292837 A1 * | 11/2012 | Hettier | .................. | F16F 13/106 267/140.13 |
| 2013/0056918 A1 * | 3/2013 | Kim | ...................... | F16F 13/106 267/140.13 |
| 2013/0175745 A1 * | 7/2013 | Kojima | ................. | F16F 13/106 267/140.11 |
| 2014/0326850 A1 * | 11/2014 | Oniwa | .................... | F16F 13/26 267/140.13 |
| 2015/0069685 A1 * | 3/2015 | Kim | ...................... | F16F 13/108 267/122 |
| 2015/0123327 A1 * | 5/2015 | Saito | ....................... | F16F 13/18 267/140.13 |
| 2015/0219178 A1 * | 8/2015 | Okumura | ................ | F16F 13/26 267/140.13 |
| 2016/0238103 A1 * | 8/2016 | Kim | ..................... | B60K 5/1208 180/291 |
| 2018/0320753 A1 * | 11/2018 | Beckmann | ............ | F16F 13/103 |

FOREIGN PATENT DOCUMENTS

| | | |
|---|---|---|
| CN | 1583443 A | 2/2005 |
| CN | 104421372 A | 3/2015 |
| DE | 10330056 A1 | 3/2004 |
| DE | 102011102076 B3 | 9/2012 |
| EP | 0136700 B1 | 4/1985 |
| EP | 0565860 A1 | 10/1993 |
| EP | 1176336 A1 | 1/2002 |
| FR | 2313223 A1 | 12/1976 |
| GB | 2391055 A * | 1/2004 ............. F16F 13/10 |
| JP | 101193426 A | 8/1989 |

OTHER PUBLICATIONS

CN Search Report, 201780030388.1, dated May 5, 2020.
Chinese Office Action, 201780030388.1, dated Jun. 2, 2020.
International Search Report 2017800303881, dated Jan. 11, 2021.
Chinese Second Office Action, 201780030388.1, dated Jan. 28, 2021.
Translation Chinese Second Office Action, 201780030388.1, dated Jan. 28, 2021.

* cited by examiner

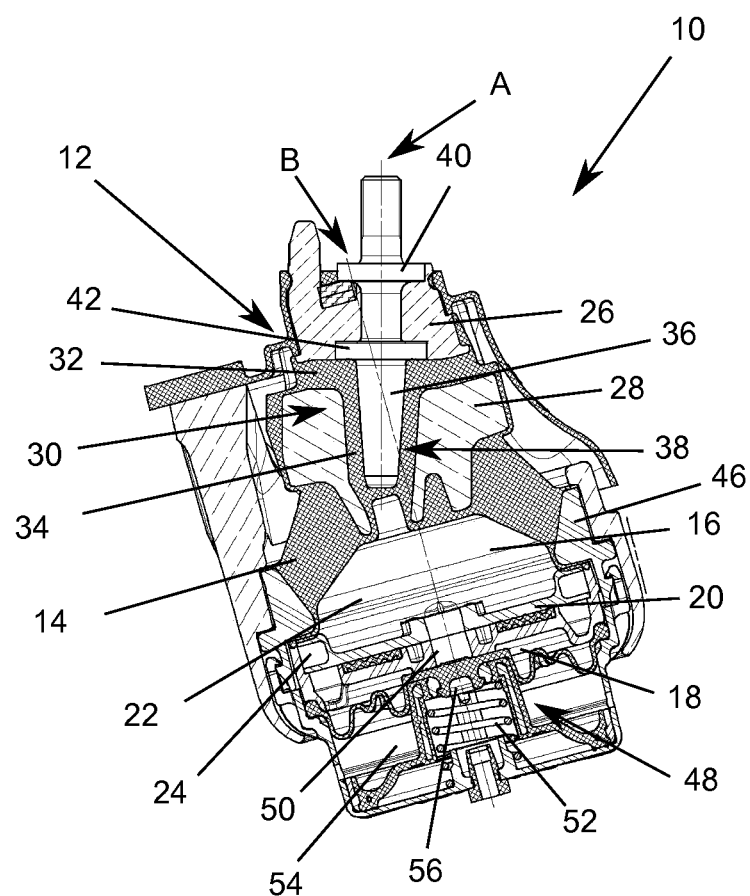

HYDRAULIC BEARING

CROSS-REFERENCE TO RELATED APPLICATIONS

This application is a National Stage Patent Application of International Patent Application No. PCT/EP2017/071354, filed Aug. 24, 2017, which claims the benefit of German Application Serial No. 10 2016 116 079.2, filed Aug. 29, 2016, the contents of each are incorporated by reference in their entireties.

TECHNICAL FIELD

The present invention relates to a hydraulic mount, in particular for mounting a motor vehicle engine, with a mount core, a supporting spring consisting of an elastomer material, a working chamber delimited by the supporting spring, and a compensation chamber separated from the working chamber by an intermediate plate, wherein the mount core has a first mount core part and a second mount core part operationally connected to each other by means of an elastomer body for high-frequency vibration decoupling.

BACKGROUND

Such hydraulically damping mounts are used, in particular, for supporting a motor vehicle engine on a vehicle body in order to, on the one hand, dampen the vibrations caused by road bumps and, on the other hand, to provide insulation against acoustic vibrations. The vibrations emphasized by road bumps are dampened by a hydraulic system, with the hydraulic system being formed by the liquid-dampened working chamber, the compensation chamber, and the damping duct connecting the two chambers with each other. The mode of operation of the hydraulic system can be described as follows. The working chamber is made larger or smaller by a movement of the supporting spring, with the liquid located in the working chamber being pressed via the damping duct into the compensation chamber. The liquid oscillating in the damping duct causes a damping action.

Hydraulic mounts are used in motor vehicles for damping and absorbing vibrations that arise. Particularly in the range of high frequencies above 1000 Hz, dynamic stiffness may reach unwanted orders of magnitude of more than 2000 N/mm. Using a divided mount core in which one mount core part is mounted by several elastomer bodies, high-frequency vibration decoupling can be obtained and unwanted high dynamic stiffnesses in the high-frequency range can be avoided.

DE 103 30 056 A1 discloses a hydraulic mount with a divided mount core, wherein the two mount core parts are connected to each other by a hollow cylindrical elastic wall, whereby a cavity is created between the first and second mount core parts. The second mount core part is mounted by means of an elastic supporting spring, whereby the second mount core part is doubly isolated from the vibrating machine. Thus, the natural resonance frequency, which has a dynamic stiffness of up to 30000 N/mm in the range from 1100 Hz to 1700 Hz, can be reduced to a resonance frequency in the range of 400 to 600 Hz with a maximum dynamic stiffness of approximately 6000 N/mm.

EP 0 136 700 B1 discloses a hydraulic mount with a divided mount core. The two mount core parts are separated from each other by a first elastomer body. A second elastomer body supports the second mount core part on the support mount. The first mount core part, the second mount core part as well as the first elastomer body and the second elastomer body delimit a working chamber with an intermediate plate. Towards the top, the working chamber has an annular gap formed by a protrusion of the first mount core part protruding into the working chamber and the first elastomer body. Due to the special configuration of the first elastomer body with components formed vertically as well as horizontally, the radial stiffness can be adjusted independently of the axial stiffness of the hydraulic mount.

SUMMARY

The invention is based on the object of providing a hydraulic mount that has an improved manufacturability, long-term durability, high-frequency isolation capacity and transverse stiffness.

To accomplish this object it is proposed, for a hydraulic mount of the type mentioned in the introduction, that the elastomer body has a first elastomer body portion absorbing at least a static mount load acting on the mount core, and a second elastomer body portion absorbing at least a transverse force acting on the mount core.

The longitudinal stiffness of the hydraulic mount can be adjusted largely independently of the transverse stiffness of the hydraulic mount due to the functional separation of the two elastomer body portions. The first elastomer body portion which, under a static preload, is subjected only to pressure transmits the static mount load from the first mount core part to the second mount core part. This results in the second elastomer body portion not settling if subjected to pressure. The second elastomer body portion is subjected only to shear under a static pre3 load. In the case of a transverse deformation of the first mount core part, a cardanic deformation of the second elastomer body portion is blocked via the first mount core part. In order to adjust the longitudinal or transverse stiffness of the hydraulic mount, the thicknesses and elasticity of the first and/or second elastomer body portions may be varied. Due to such a configuration, residual tensile stresses due to loss under preload will not occur in the elastomer body, which increases long-term durability. A simple manufacturability is ensured by the compact design of the hydraulic mount.

Advantageous embodiments of the hydraulic mount are the subject matter of the dependent claims.

In an advantageous embodiment, the hydraulic mount has a transverse stiffness and a longitudinal stiffness, wherein the transverse stiffness is at least 60% of the longitudinal stiffness.

In an advantageous embodiment, the first elastomer body portion is disposed perpendicularly to a central axis of the first mount core part and/or a central axis of the second mount core part, and the second elastomer body portion is disposed along the central axis of the first mount core part and/or the central axis of the second mount core part.

Thus, cardanic deformations of the second elastomer body portion can be blocked via the first elastomer body portion. Longitudinal forces acting on the hydraulic mount are transmitted from the elastomer body portion onto the supporting spring. Thus, a settling of the second elastomer body portion in the direction of the working chamber, which acts on the second elastomer body portion due to static longitudinal forces, which permanently act on the hydraulic mount and are caused by the weight of the engine, can be prevented. This has an advantageous effect on both the life and the functional capability of the second elastomer body portion. Moreover, wear phenomena in the elastomer body caused by shear forces can be avoided.

In an advantageous embodiment, the second mount core part has a passage into which the first mount core part protrudes. A compact design, which fits into commonly used standardized packages, can thus be realized. Thus, the first mount core part may protrude into the passage of the second mount core part only partially or completely.

In an advantageous embodiment, the first mount core part has a conically formed protrusion protruding into a corresponding conical passage of the second mount core part.

In an advantageous embodiment, the conically formed protrusion of the first mount core part is formed as a pin member. Advantageously, the pin member has a fastening ring resting on the first elastomer body portion in order to improve the absorption of the static forces of the engine on the first elastomer body portion. The pin member may be connected to the first mount core part positively, non-positively and/or by substance-to-substance connection. Thus, the first mount core part may have an opening into which the pin member is inserted.

In an advantageous embodiment, the second elastomer body portion is formed in a conical manner, and the first elastomer body portion is formed in an annular manner. Due to the conical configuration, residual tensile stresses due to loss under preload cannot occur. This has an advantageous effect on the life of the second elastomer body portion. The second elastomer body portion may surround the conically formed protrusion, while the second elastomer body portion is surrounded by the second mount core part, which is conically contoured in the region of the second elastomer body portion. For example, the second elastomer body portion surrounds the conically formed protrusion of the first mount core part completely in the region of the second mount core part, and the second elastomer body portion is completely surrounded by the second mount core part. Due to this structure, the hydraulic mount is capable of obtaining a particularly high transverse stiffness as compared with its longitudinal stiffness.

In an advantageous embodiment, the second mount core part is completely enclosed by the elastomer body.

In an advantageous embodiment, the elastomer body is connected to the supporting spring by substance-to-substance connection. Thus, the supporting spring and the elastomer body can be manufactured in a single working step, and therefore particularly cost-effectively.

In an advantageous embodiment, the central axis of the working chamber is inclined relative to the central axis of the first mount core part and/or to the central axis of the second mount core part.

In an advantageous embodiment, the hydraulic mount has a switching device that is capable of opening or closing an absorber duct incorporated into the intermediate plate. If the absorber duct is open, a fluid column which reduces the dynamic spring rate of the hydraulic mount is able to oscillate in the absorber duct. The switching device may be of a pneumatic, magnetic or other type of switching device for hydraulic mounts common to the person skilled in the art.

BRIEF DESCRIPTION OF THE DRAWINGS

The hydraulic mount and further features and advantages are explained below with reference to an exemplary embodiment, which is schematically depicted in the FIGURE. In the drawing:

FIG. 1 shows a cross section through a hydraulic mount.

DETAILED DESCRIPTION

The hydraulic mount 10 depicted in FIG. 1 serves for supporting a motor vehicle engine that is not shown on a motor vehicle body that is not shown.

The hydraulic mount 10 comprises a mount core 12, a supporting spring 14 consisting of an elastomer material, a working chamber 16 delimited by the supporting spring 14, and a compensation chamber 18 separated from the working chamber 16 by an intermediate plate 20. The working chamber 16 and the compensation chamber 18 are filled with a hydraulic fluid 22 and connected to each other by a flow transfer duct 24 incorporated into the intermediate plate 20.

The mount core 12 has a first mount core part 26 and a second mount core part 28 operationally connected to each other by means of an elastomer body 30. The two mount core parts 26, 28 are made of metal and connected to the elastomer body 30 by substance-to-substance connection.

In addition, the first mount core part 26 has a conically formed protrusion in the form of a pin member 36 protruding into a conical passage 38 of the second mount core part 28. The pin member 36 is connected to the first mount core part 26 by means of a first fastening ring 40 and a second fastening ring 42.

The elastomer body 30 is connected to the supporting spring 14, in particular by being made from the same material, and has a first elastomer body portion 32 and a second elastomer body portion 34. The first elastomer body portion 32 is configured to be approximately annular and disposed between the first mount core part 26 and the second mount core part 28, and serves for absorbing the static load. The second elastomer body portion 34 extends perpendicularly to the first elastomer body portion 32 and is disposed within the passage 38. The second elastomer body portion 34 serves for adjusting the longitudinal and transverse stiffness of the hydraulic mount 10.

As is also apparent from the FIGURE, the central axis B of the working chamber 22 is inclined relative to the central axis A of the first mount core part 26 and/or to the central axis A of the second mount core part 28.

The first elastomer body portion 32 which, under a static preload, is subjected only to pressure transmits the static mount load from the first mount core part 26 to the second mount core part 28, which transmits the static mount load to the supporting spring 14. In the case of a transverse deformation of the first mount core part 26, a cardanic deformation of the second elastomer body portion 34 is blocked via the first mount core part 26. The second elastomer body portion 34 is subjected only to shear under a static load. For this purpose, the static load is transmitted to the second elastomer body portion 34 via the pin member 36. In order to adjust the longitudinal or transverse stiffness of the hydraulic mount 10, the thicknesses and elasticity of the first and/or second elastomer bodies 32, 34 may be varied. At the same time, the high-frequency vibration decoupling of the hydraulic mount can be realized by the double isolation of the second mount core part 28 by means of the elastomer body 30 and the supporting spring 14.

In addition, the hydraulic mount 10 has a pneumatic switching device 48 by means of which an absorber duct 50 incorporated into the intermediate plate 20 can be switched. The switching device 48 comprises a compression spring 52, a negative-pressure chamber 54 and a plug 56 for closing the absorber duct 50. When the negative pressure is applied in the negative-pressure chamber 54, the spiral-shaped compression spring 52 is compressed, and the plug 56 unblocks the absorber duct 50. A fluid column can then oscillate therein and reduce the dynamic spring rate of the hydraulic mount 10. The switching device 48 may also be a magnetic or other type of switching device for hydraulic mounts common to the person skilled in the art.

The invention claimed is:

1. A hydraulic mount for mounting a motor vehicle engine, the hydraulic mount comprising:
   a mount core,
   a supporting spring comprising an elastomer material, a working chamber delimited by the supporting spring, and
   a compensation chamber separated from the working chamber by an intermediate plate, wherein the working chamber and the compensation chamber are filled with hydraulic fluid and connected to each other by a flow transfer duct,
   wherein the mount core has a first mount core part and a second mount core part; wherein the second mount core part has a passage into which the first mount core part protrudes;
   wherein the first mount core part has a pin member connected thereto and protruding into the passage of the second mount core part; wherein the second mount core part is conical;
   wherein the first mount core part and the second mount core part are connected to each other by an elastomer body for high-frequency vibration decoupling;
   wherein the elastomer body has a first elastomer body portion configured to absorb at least a static mount load acting on the mount core, and a second elastomer body portion configured to absorb at least a transverse force acting on the mount core;
   wherein the first elastomer body portion is disposed between the first mount core part and the second mount core part, and the second elastomer body portion is disposed between the pin member and the second mount core part;
   wherein the pin member is connected to the first mount core part via at least one fastening ring;
   wherein the at least one fastening ring rests on the first elastomer body portion.

2. The hydraulic mount according to claim 1, wherein the hydraulic mount has a transverse stiffness and a longitudinal stiffness, wherein the transverse stiffness is at least 60% of the longitudinal stiffness.

3. The hydraulic mount according to claim 1, wherein the first elastomer body portion is disposed perpendicularly to a central axis of the first mount core part and/or a central axis of the second mount core part, and that the second elastomer body portion is disposed along the central axis of the first mount core part and/or the central axis of the second mount core part.

4. The hydraulic mount according to claim 1, wherein the second elastomer body portion is formed with a conical extent, and that the first elastomer body portion is annular.

5. The hydraulic mount according to claim 1, wherein the second mount core part is completely enclosed by the elastomer body.

6. The hydraulic mount according claim 1, wherein the elastomer body and the supporting spring are made from the same material and are formed together.

7. The hydraulic mount according claim 6, wherein the elastomer body and the supporting spring are formed as a single, unitary component.

8. The hydraulic mount according to claim 6, wherein the elastomer body and the supporting spring are formed together in a single working step.

9. The hydraulic mount according to claim 1, wherein a central axis of the working chamber is inclined relative to a central axis of the first mount core part and/or to a central axis of the second mount core part.

10. The hydraulic mount according to claim 1, wherein the hydraulic mount is a switchable hydraulic mount.

* * * * *